United States Patent
Kraemer

(12) 
(10) Patent No.: US 6,321,156 B1
(45) Date of Patent: Nov. 20, 2001

(54) METHOD AND APPARATUS FOR DETERMINING THE CYLINDER CHARGE IN THE CASE OF UNTHROTTLED INTERNAL-COMBUSTION ENGINES

(75) Inventor: Gerd Kraemer, Baierbrunn (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/506,446

(22) Filed: Feb. 18, 2000

(30) Foreign Application Priority Data

Feb. 18, 1999 (DE) .............................. 199 06 707

(51) Int. Cl.⁷ .......................... F02D 41/18; G01M 15/00
(52) U.S. Cl. ........................................ 701/102; 73/118.2
(58) Field of Search .................................. 701/101, 102; 73/116, 118.2

(56) References Cited

U.S. PATENT DOCUMENTS 5,635,634 * 6/1997 Reuschenbach et al. ............ 73/118.2
5,974,870 * 11/1999 Treinies et al. ...................... 73/118.2

FOREIGN PATENT DOCUMENTS

4236008A1  4/1994 (DE) .
19620883A1 11/1997 (DE) .
19740914A1 10/1998 (DE) .

OTHER PUBLICATIONS

Klueting,Manfred, u.a.: Drosselfreie Laststeuerung mit vollvariablen Ventriltrieben. In MTZ—Motortechnische Zeitschrift 60, 1999, 7/8, 476–484.

German Patent Office Action (Search Report) for application 19906707.4 Sep. 20, 1999.

* cited by examiner

Primary Examiner—Andrew M. Dolinar
(74) Attorney, Agent, or Firm—Crowell & Moring LLP

(57) ABSTRACT

A method and apparatus is provided for determining the cylinder charge in the case of unthrottled internal-combustion engines with a variable valve gear. For determining the fresh-air cylinder charge in the case of such internal-combustion engines, the following steps are followed (i) at least one engine operating value is determined, (ii) a standardized air flow rate is determined relative to a defined inlet and outlet spread as a function of the at least one engine operating value, and (iii) the influence of the actual inlet spread existing in comparison to the defined inlet spread on the air flow rate is determined and a corrected air flow rate is calculated.

16 Claims, 2 Drawing Sheets

US 6,321,156 B1

METHOD AND APPARATUS FOR DETERMINING THE CYLINDER CHARGE IN THE CASE OF UNTHROTTLED INTERNAL-COMBUSTION ENGINES

BACKGROUND AND SUMMARY OF THE INVENTION

This application claims the priority of German Patent Document 199 06 707.4, filed Feb. 18, 1999, the disclosure of which is expressly incorporated by reference herein.

The invention relates to a method for determining the cylinder charge in the case of unthrottled internal-combustion engines which comprises valves with a variable valve gear.

In the case of throttled engines, the charge (air masses) of the cylinders of the engine is usually measured. For dynamic transitions, the charge is calculated by means of a model in parallel by way of a charge model and is adapted to the above-mentioned measurement. By way of a suction pipe pressure and a variable cam spread, a correction of the calculated charge can also be carried out.

However, the above-described charge model cannot be used for unthrottled engines. The reason is that there is no connection between the suction pipe pressure and the cylinder charge. However, the knowledge of the cylinder charge is required for the dynamic engine operation of engines with a variable valve gear as well as for the diagnostic and safety functions.

It is therefore an object of the present invention to indicate a method for determining the cylinder charge in the case of unthrottled internal-combustion engines which permits a determination of the charge which is as precise as possible This object is achieved by a method for determining the cylinder charge in the case of unthrottled internal-combustion engines, which have valves with a variable valve gear, said method comprising;

determining at least one engine value, determining a standardized air flow rate relative to a defined inlet and/or outlet spread as a function of the at least one engine value, and determining the influence of the actual inlet spread existing in comparison to the defined inlet spread on the air flow rate and calculating a corrected air flow rate based on the determined influence.

In particular, first a standardized air flow rate is determined as a function of at least one engine value, which air flow rate is related to a fixed or known inlet and outlet spread. The engine values are, for example, the rotational speed and the height of the valve lift. In addition, the influence of the present actual inlet spread in comparison to the assumed fixed or known inlet spread is determined and a correct air flow rate is determined. In particular, by means of the above-mentioned approach, the influence of inlet (and, in the case of the advantageous embodiments) also of outlet spreads on the intake operation of the engine with a variable valve gear is described while taking into account geometrical and physical "effects". Only data of the air flow rate in the case of certain spreads must still be applied here, for example, in the form of characteristic diagrams. In a characteristic diagram, the taken-in air flow rate at fixed inlet and outlet spreads (such as 120/120) and at standard conditions (for example, 0° C. and 1,013 bar) may also be filed.

In this context, it is also noted that the standardized air flow rate must not necessarily be determined from a fixed spread. It may also be read out of the characteristic diagram at an arbitrary spread. The function will then take into account the influence of the deviation of the actual spread to the desired spread. The input for the desired spread may, for example, be derived from a load-dependent characteristic diagram.

It is known that, in the case of engines with a variable valve gear, the throttling takes place by way of the inlet valve. Therefore, the air mass flowing via the inlet valve is proportional to the opened throttle surface and dependent on the differential pressure. According to an advantageous embodiment, these values are taken into account for determining the influence of the actual inlet spread. If the inlet spread therefore deviates from the standard spread, the influence of a changed inlet spread onto the air flow rate is described by the surface fraction and the differential pressure fraction. This will be illustrated more precisely in the following embodiment.

The outlet spread also has an influence on the cylinder charge. For the precise determination of the cylinder charge, the influence of the outlet spread is preferably described by the ratio of the outlet valve surface behind the upper dead center. In the following, a special embodiment of the invention will be described in detail with reference to the drawings.

Other objects, advantages and novel features of the present invention will become apparent from the following detailed description of the invention when considered in conjunction with the accompanying drawings.

DETAILED DESCRIPTION OF THE DRAWINGS

A special method and apparatus for determining the cylinder charge according to the invention will be explained by means of FIG. 1 which is a schematic block diagram of such a method. The method will be performed by a computer processing unit which is supplied with the pertinent characteristic diagram and the actual engine operating conditions.

The taken-in air flow rate with a fixed inlet and outlet spread at the standard conditions 0° C. and 1,013 mbar is filed in a characteristic diagram KFLM1212, 410. The fixed inlet and outlet spread presently amounts to 120/120. From the input engine values rotational speed N, 400, and actual stroke of the intake valve evhub-ist, 402, an air flow rate filed for these data is read out of the characteristic diagram KFLM-1212. This air flow rate also depends on the intake valve operation and is particularly proportional to the opened-up throttle surface and is dependent on the differential pressure by way of the intake valve. In this context, reference is made to the throttle equation according to Bernulli. Accordingly, corrections are still required on the air flow rate determined from the characteristic diagram KFLM-1212. Currently a correction factor, which relates to the spread of the intake valve, is determined as follows. The influence on the air mass is assumed as the ratio of the intake surface multiplied by the differential pressure fraction of an actual spread, on the one hand, to the intake surface multiplied by the differential fraction in the case of a standard spread, on the other hand. The standard spread is the spread by means of which the characteristic air mass diagram KFLM-1212 was measured. In contrast, the actual spread indicates the spread in the dynamic operation or in the cold operation.

Figure 1:
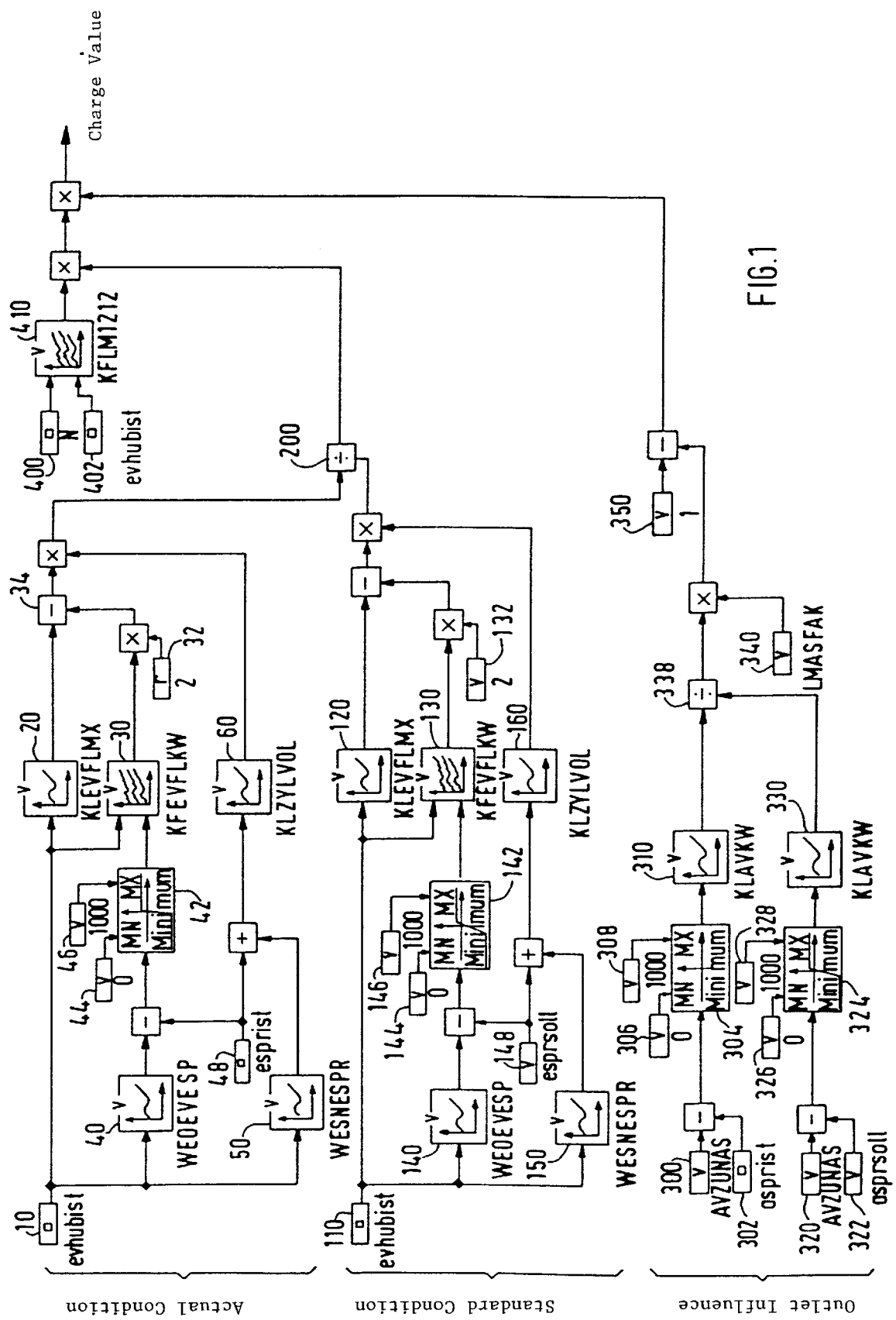
FIG. 1 is a schematic block diagram of an embodiment of the method and apparatus according to the invention.

FIG. 1 illustrates three blocks which indicate the certain influences on the charge, specifically the actual condition, the standard condition and the outlet influence. In this case, the actual condition is the influence of the current actual spread, as indicated above; the standard condition is the influence of the standard spread, as indicated above; and the outlet influence is the influence of the outlet spread on the cylinder charge.

The following concerns the influence in the case of the actual spread (actual condition): The actual stroke value of the intake valve evhub-ist, 10, is provided to different characteristic diagrams 20, 30, 40 and 50. In the characteristic diagram 20 (KLEVFLMX), the maximal intake surface from the stroke course, integrated on over the crank angle, is stored. The maximal intake surface is therefore read out of the characteristic diagram 20.

However, the valve opening situated in front of the upper dead center does not contribute to the cylinder charge because, in this phase, the piston pushes residual gas back into the intake duct. In order to take this effect into account, in the characteristic diagram 30 (KFEVFLKW), the valve opening surface situated in front of the upper dead center is calculated as a function of the opening of the inlet angle and the valve stroke evhub-ist. The opening of the intake valve is the result of the actual intake valve spread value esprist, 48, which is subtracted from the point in time of the opening of the intake valve in front of the point of the maximal stroke. This value is obtained from the characteristic diagram 40 (WEOEVESP), which receives as the input quantity also the actual stroke value of the intake valve evhub-ist. The unit with the reference numbers 42, 44 and 46 is used for adapting the value of the valve opening surface situated in front of the upper dead center to the characteristic diagram 30.

Since the residual gas pushed back in front of the upper dead center back into the intake duct is taken in again only after the intake operation ((stopper model), the intake valve surface situated in front of the upper dead center is doubled and subtracted from the maximal valve opening surface (reference number 32).

On the whole, the effective intake surface is therefore available after the subtraction 34.

Next, the influence of the differential pressure will be described. The position of the effective intake surfaces relative to the crank angle has an influence on the taken-in air mass. This dependence is described in the characteristic diagram 60 (KLZYLVOL). In the characteristic diagram 60, as a function of the crank angle, the cylinder volume is filed during the intake behind the upper dead center. The input into this characteristic curve is the point in time when the intake valve closes as a function of the intake valve stroke and of the spread. These data are read out of the characteristic diagram 50 (WESNESPR). The point in time of the closing of the intake valve is filed in this characteristic diagram behind the point of the maximal stroke in the graduation of the crankshaft. The actual stroke value of the intake valve evhub-ist, 10, is also used as the input quantity for the characteristic diagram 50.

With the last-mentioned measure, two effects during the intake are taken into account which describe the differential pressure by way of the intake valve during the intake. On the one hand, a "prestressing" of the cylinder is taken into account by a late opening of the intake valve. The air mass is increased by the resulting higher differential pressure during the intake, which is taken into account by the higher cylinder volume with an increasing spread. On the other hand, a termination of the intake as the result of an early closing of the intake valve at smaller spreads leads to a decrease of the cylinder volume. This is also taken into account.

Thus, the influences for the current actual spread were therefore determined above as the result of the effective intake surface and the differential pressure fraction.

A corresponding calculation takes place for the standard spread (standard condition). Analogously, by means of reference numbers 110 to 160 and the assigned portion in FIG. 1, the influence of the effective intake surface and of the differential pressure fraction is determined for the standard spread. Here, the difference is only that the desired spread value for the intake valve is filed in reference number 148.

After the calculation of the influences of the standard and actual spreads, the ratio is formed (reference number 200) which is then used as the factor for the air flow rate read out from the characteristic diagram 410.

As another correction factor for the air flow rate read out in the characteristic diagram 410, the influence of the outlet spread is determined. For this purpose, the lower portion of the representation in FIG. 1 is used. In this case, the ratio of the outlet valve surface behind the upper dead center is formed in the actual and standard condition (reference number 338), which ratio is scaled by way of a factor LMASFAK (reference number 340) by way of a multiplication. This value is subtracted from a defined 1 (reference number 350) and is determined as a factor also for the value of the taken-in air mass 410 (KFLM 1212). The values for the different branches are obtained by the opening of the outlet valve AVZUNAS (reference number 300 and 320) minus the actual or desired spread values of he outlet valve (reference number 302 or 322). The functions indicated by the reference numbers 306, 308, 304, 324, 326 and 328 each represent only a suitable scaling for the characteristic diagrams 310, 330.

As the result of the above-mentioned measures, the influences of the intake and outlet valve spread on the taken-in air flow rate can be determined. By multiplying the air flow rate determined from the characteristic diagram KFLM-1212 (reference number 410), a precise value of the charge of cylinders is obtained while the engine is unthrottled and the valve gear is variable.

Figure 2:
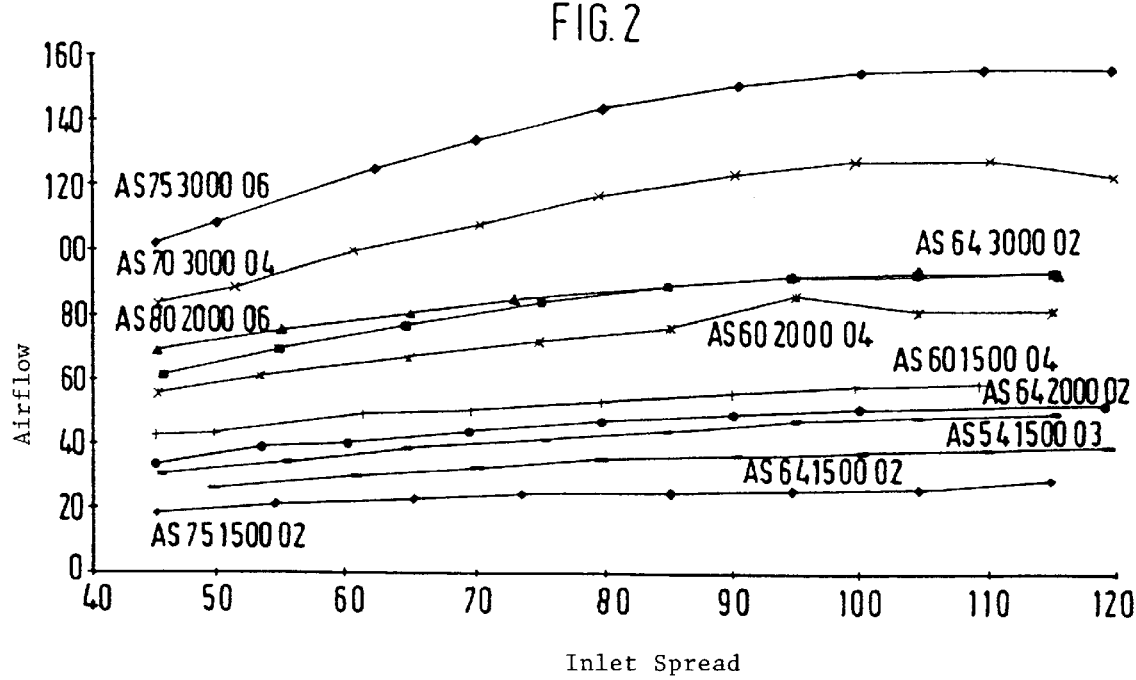
FIG. 2 is a diagram which shows the effects of the inlet spread on the air mass.

FIG. 2 illustrates the influence of the inlet spread on the taken-in air mass. For different characteristic curves, it is shown that, when the inlet spread increases, the air mass also increases essentially monotonously.

Figure 3:
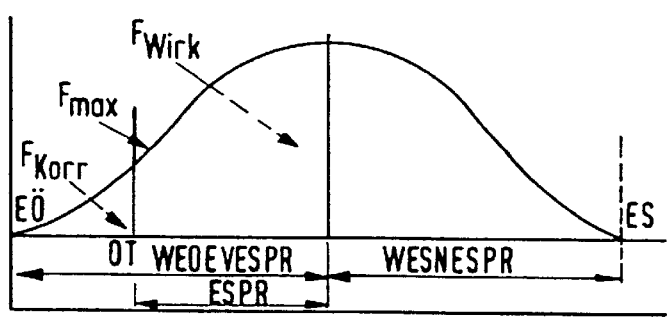
FIG. 3 is a diagram which shows the inlet surface below the curve for an intake cycle.

FIG. 3 shows a diagram which illustrates the effective intake surface. The surface is obtained by the integration of the stroke course by way of the crank angle from the point in time of the opening of the intake valve to the point in time of the closing of the intake valve (ES). In this case, WESNESPR indicates the point in time "close intake valve" behind the point of the maximal stroke of the intake valve in degrees and the quantity WEOEVESPR indicates the point in time "open intake valve" in front of the point of the maximal stroke. The quantity ESPR indicates the intake valve spread, thus the point in time between the upper dead center and the maximal stroke of the intake valve. The total surface under the curve in FIG. 3 results in the maximal intake surface $F_{max}$. From it, the valve opening surface must be subtracted which is situated in front of the upper dead center and does not contribute anything to the cylinder charge because, in this phase, the piston pushes residual gas back into the intake duct $F_{Kor}$. The surface under the graph, which is indicated in gray in FIG. 3, remains as the effective surface $F_{Wirk}$.

Figure 4:
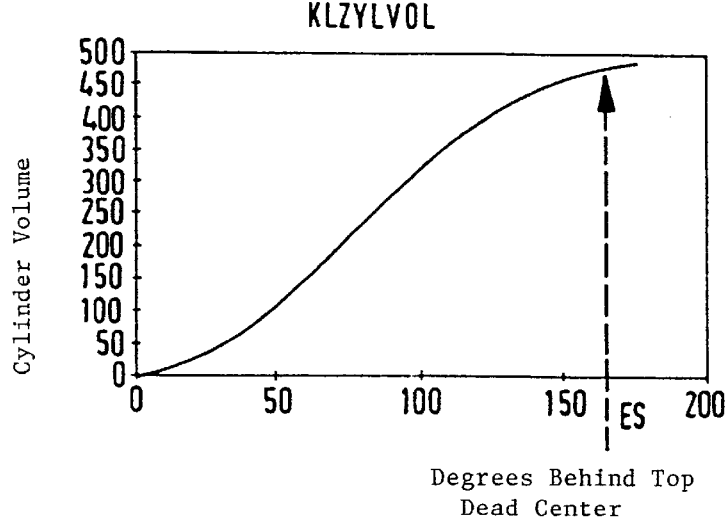
FIG. 4 is a diagram which shows the influence of the outlet valves on the charge.

FIG. 4 illustrates the influence of the position of the effective intake surface relative to the crank angle. The diagram shows the cylinder volume as a function of the crankshaft angle behind the upper dead center. According to the point in time of the closing of the intake valve ES, the differential pressure changes with the position of the intake surface with respect to the crank angle, which is expressed by the quantity KLZYLVOL (also compare FIG. 1).

On the whole, a precise and simple method is provided for determining the cylinder charge in the case of unthrottled internal-combustion engines.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for determining a cylinder charge in the case of unthrottled internal-combustion engines, which have valves with a variable valve gear, said method comprising;

determining at least one engine operating value, determining a standardized air flow rate relative to at least one of a defined inlet spread and a defined outlet spread as a function of the at least one engine operating value, and determining the influence of a respective one of at least one of an actual inlet spread and an actual outlet spread existing in comparison to the corresponding respective one of the defined inlet spread and defined outlet spread on the air flow rate and calculating a corrected air flow rate based on the determined influence.

2. Method according to claim 1, wherein the at least one engine operating value includes the rotational engine speed and the stroke height of the intake valves, and wherein the standardized air flow rate is determined as a function of the rotational engine speed and of the stroke height of the intake valves.

3. Method according to claim 1, wherein said standardized air flow rate is determined relative to a defined inlet spread as a function of the at least one engine operating value, and wherein when determining the influence of the actual inlet spread, at least one of an effective intake surface and an effective differential pressure fraction is taken into account.

4. Method according to claim 2, wherein said standardized air flow rate is determined relative to a defined inlet spread as a function of the at least one engine operating value, and wherein when determining the influence of the actual inlet spread, at least one of an effective intake surface and an effective differential pressure fraction is taken into account.

5. Method according to claim 1, wherein said standardized air flow rate is determined relative to a defined outlet spread as a function of the at least one engine operating value, and wherein an influence of the actual outlet spread existing in comparison to the defined outlet spread onto the air flow rate is determined and a corrected air flow rate is calculated.

6. Method according to claim 2, wherein said standardized air flow rate is determined relative to a defined outlet spread as a function of the at least one engine operating value, and wherein an influence of the actual outlet spread existing in comparison to the defined outlet spread onto the air flow rate is determined and a corrected air flow rate is calculated.

7. Method according to claim 3, wherein said standardized air flow rate is determined relative to a defined outlet spread as a function of the at least one engine operating value, and wherein an influence of the actual outlet spread existing in comparison to the defined outlet spread onto the air flow rate is determined and a corrected air flow rate is calculated.

8. Method according to claim 4, wherein said standardized air flow rate is determined relative to a defined outlet spread as a function of the at least one engine operating value, and wherein the influence of the actual outlet spread existing in comparison to the defined outlet spread onto the air flow rate is determined and a corrected air flow rate is calculated.

9. Apparatus for determining a cylinder charge in the case of unthrottled internal-combustion engines which have valves with a variable valve gear, comprising:

means for determining at least one engine operating value, means for determining a standardized air flow rate relative to at least one of a defined inlet spread and a defined outlet spread as a function of the at least one engine operating value, and means for determining the influence of at least one of an actual inlet spread existing in comparison to the defined inlet spread and an actual outlet spread existing in comparison to the defined outlet spread on the air flow rate and calculating a corrected air flow rate based on the determined influence.

10. Apparatus according to claim 9, wherein the at least one engine operating value includes the rotational engine speed and the stroke height of the intake valves, and wherein the standardized air flow rate is determined as a function of the rotational engine speed and of the stroke height of the intake valves.

11. Apparatus according to claim 9, wherein said standardized air flow rate is determined relative to a defined inlet spread as a function of the at least one engine operating value, and wherein when determining the influence of the actual inlet spread, at least one of an effective intake surface and an effective differential pressure fraction is taken into account.

12. Apparatus according to claim 10, wherein said standardized air flow rate is determined relative to a defined inlet spread as a function of the at least one engine operating value, and wherein when determining the influence of the actual inlet spread, at least one of an effective intake surface and an effective differential pressure fraction is taken into account.

13. Apparatus according to claim 9, wherein said standardized air flow rate is determined relative to a defined outlet spread as a function of the at least one engine operating value, and wherein an influence of the actual outlet spread existing in comparison to the defined outlet spread onto the air flow rate is determined and a corrected air flow rate is calculated.

14. Apparatus according to claim 10, wherein said standardized air flow rate is determined relative to a defined outlet spread as a function of the at least one engine operating value, and wherein an influence of the actual outlet spread existing in comparison to the defined outlet spread onto the air flow rate is determined and a corrected air flow rate is calculated.

15. Apparatus according to claim 11, wherein said standardized air flow rate is determined relative to a defined outlet spread as a function of the at least one engine operating value, and wherein an influence of the actual outlet spread existing in comparison to the defined outlet spread onto the air flow rate is determined and a corrected air flow rate is calculated.

16. Apparatus according to claim 12, wherein said standardized air flow rate is determined relative to a defined outlet spread as a function of the at least one engine operating value, and wherein an influence of the actual outlet spread existing in comparison to the defined outlet spread onto the air flow rate is determined and a corrected air flow rate is calculated.

* * * * *